US005654383A

United States Patent [19]
Köhler et al.

[11] Patent Number: 5,654,383
[45] Date of Patent: Aug. 5, 1997

[54] POLYARYLENE SULFIDES REDUCED IN VISCOSITY BY AFTERTREATMENT WITH DISULFIDES

[75] Inventors: Burkhard Köhler; Klaus Kraft, both of Krefeld; Klaus Reinking, Wermelskirchen; Bahman Sarabi; Wolfgang Ebert, both of Krefeld, all of Germany

[73] Assignee: Bayer AG, Leverkusen, Germany

[21] Appl. No.: 268,874

[22] Filed: Jun. 30, 1994

Related U.S. Application Data

[63] Continuation of Ser. No. 977,047, Nov. 16, 1992, abandoned.

[30] Foreign Application Priority Data

Nov. 27, 1991 [DE] Germany .................... 41 38 907.7

[51] Int. Cl.⁶ .................... C08F 283/00; C08G 75/00
[52] U.S. Cl. .................... 525/537; 528/388
[58] Field of Search .................... 525/537; 528/388

[56] References Cited

U.S. PATENT DOCUMENTS

| 4,535,149 | 8/1985 | Ebert et al. ................ | 528/388 |
| 4,605,713 | 8/1986 | Heitz et al. ................ | 525/537 |
| 4,605,732 | 8/1986 | Heitz et al. ................ | 525/537 |
| 4,820,801 | 4/1989 | Inoue et al. ................ | 528/388 |
| 4,877,851 | 10/1989 | Fagerburg et al. ........... | 525/537 |
| 5,015,704 | 5/1991 | Takekoshi et al. ........... | 525/537 |

*Primary Examiner*—Helen Lee
*Attorney, Agent, or Firm*—Connolly & Hutz

[57] ABSTRACT

The invention relates to polyarylene sulfides (PAS), preferably polyphenylene sulfide (PPS), reduced in viscosity by aftertreatment of the PAS formed in the production process with disulfides in the melt.

9 Claims, No Drawings

POLYARYLENE SULFIDES REDUCED IN VISCOSITY BY AFTERTREATMENT WITH DISULFIDES

This application is a continuation of application Ser. No. 07/977,047 filed on Nov. 16, 1992, now abandoned.

This invention relates to polyarylene sulfides (PAS), preferably polyphenylene sulfide (PPS), reduced in viscosity by aftertreatment of the PAS formed in the production process with disulfides in the melt.

PPS is produced, for example, from p-dichlorobenzene and sodium sulfide, the p-dichlorobenzene being used in equimolar quantities or in a slight excess. Accordingly, low molecular weight polyphenylene sulfides (PPS) generally have a higher chlorine content than high molecular weight polyarylene sulfides.

PPS of low molecular weight and, hence, relatively low viscosity is suitable, for example, for the encapsulation of electronic components. The tendentially higher chlorine content of low viscosity PPS is undesirable in this particular application because HCl can be eliminated on exposure to heat.

Accordingly, it is desirable to combine the good flow properties of low viscosity PPS with the low chlorine content of high-viscosity PPS types.

One way of achieving this objective is the selective use of chain terminators in the production of PAS. The use of disulfides as chain regulators in the production of PAS is known from DE-A 3 817 821. However, the presence of chain regulators during the polymerization process is attended, for example, by the disadvantage of possible contamination of the circuits of the production plant. Where large quantities of terminator are used, therefore, the following batches can also have lower than usual viscosities.

Accordingly, the problem addressed by the present invention was to reduce the viscosity of PAS after production and isolation by aftertreatment in a separate reaction step.

It has now been found that the viscosity of PAS, preferably PPS, produced in the absence of chain terminators can be reduced by aftertreatment of the polymer with disulfides, preferably aromatic disulfides, in the melt.

Accordingly, the present invention relates to polyarylene sulfides, preferably polyphenylene sulfides, obtained by fusion of A) 99.8 to 93% by weight polyphenylene sulfides having a melt viscosity of 15 to 500 Pas (310° C., 1000 l/s), B) 0.2 to 7% by weight disulfides corresponding to formulae (I), (II) and/or (III), preferably to formula (I)

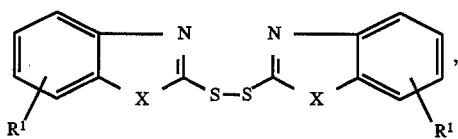 (I)

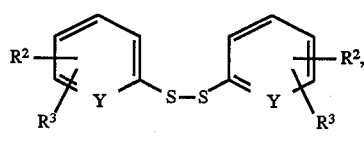 (II)

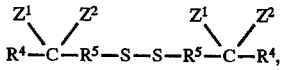 (III)

in which $R^1$ is hydrogen, a $C_{1-22}$ alkyl radical, a $C_{1-22}$ alkoxy radical, a halogen atom, such as Cl, Ar, a carboxy group, preferably hydrogen, X represents NH or S, preferably S, $R^2$ and $R^3$ may be the same or different and represent hydrogen, a $C_{1-22}$ alkyl radical, a $C_{1-22}$ alkoxy radical, a carboxy group, a nitro group or a halogen atom (Cl, Br), preferably hydrogen, a carboxy group or a nitro group, or $R^2$ and $R^3$ are members of a 5- to 7-membered ring, preferably a benzene ring, and Y represents CH or N, preferably CH, $R^4$ is hydrogen or a $C_{1-22}$ alkyl radical or a $C_{6-14}$ aryl radical, $R^5$ is a $C_{1-22}$ alkylene radical or a chemical bond and $Z^1$ and $Z^2$ represent hydrogen, a carboxy group, an ester group, preferably a $C_{1-6}$ ester group, an amino group ($NH_2$) or a $C_{1-22}$ alkyl, preferably a $C_{1-6}$, alkyl or $C_{1-6}$ dialkylamino group and C) 0 to 400 parts by weight, based on 100 parts by weight of the mixture of A) and B), of fillers and/or reinforcing materials.

Fillers and/or reinforcing materials are, for example, glass fibers, carbon fibers, gypsum, talcum, dolomite, quartz, zinc sulfide, zinc oxide, lime, magnesium carbonate, carbon black, graphite or heavy spar, etc.

The present invention also relates to a process for the production of the blends according to the invention, characterized in that the mixture of components A) and B) and, optionally, C) is mixed in the melt for 10 to 120 seconds at temperatures of 280° to 360° C.; components A) and B) may also be mixed in a separate melting step and components C) may be added in a separate melting step or components A) and C) may be mixed in a separate melting step and components B) may be added in a separate melting step. Extruders or kneaders are preferably used as the mixing units.

Polyarylene sulfides to be used in accordance with the invention are known, for example, from EP 171 021.

The disulfides of formula (I) used are known and are commercially available (for example Vulkacit®, a product of Bayer AG).

The disulfides of formula (II) are also known and commercially available, for example from Aldrich.

The polyphenylene sulfides obtainable in accordance with the invention show good flow properties and may be used for the production of molded articles, for example as encapsulating compounds for electronic components.

EXAMPLES

The components were mixed in a Pfleiderer ZSK 32 at 320° C. The viscosities were measured by capillary viscosimetry at 310° C. The values for 1000 l/s are shown.

EXAMPLE 1

99.2% by weight of a PPS having a melt viscosity of 90 Pas are mixed with 0.8% by weight Vulkacit DM®, bis-(2-benzthiazolyl)-disulfide. The viscosity measured 37 Pas.

EXAMPLE 2

Comparison 59.8% by weight PPS (60 PAS), 40% by weight glass fibers (FT 562®, a product of Asahi) and 0.2% by weight polyethylene wax (PE 520®, a product of Hoechst) are mixed. A blend having a viscosity of 162 Pas is obtained.

Invention 58.8% by weight PPS (60 PAS), 40% by weight glass fibers (FT 562®, a product of Hoechst) and 1% by weight 2,2'-dinitrodiphenyl sulfone are mixed. A blend having a viscosity of 135 Pas is obtained.

EXAMPLE 3

99.2% by weight of a PPS (90 PAS) are mixed with 0.8% by weight diphenyl disulfide. The blend obtained has a viscosity of 35 Pas.

EXAMPLE 4

99.6% by weight of a PPS (96 Pas) are mixed with 0.4% by weight L-cystine. The blend obtained has a viscosity of 62 Pas.

We claim:

1. A process for the production of polyarylene sulfides, wherein said process consists of mixing A) 99.8 to 93% by weight polyphenylene sulfides having a melt viscosity of 15 to 500 Pas (310° C., 1000 1/s), B) 0.2 to 7% by weight disulfides corresponding to formulae (I), (II) and/or (III)

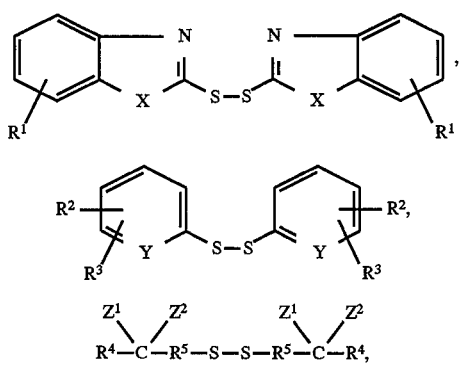

in which $R^1$ is hydrogen, a $C_{1-22}$ alkyl radical, a $C_{1-22}$ alkoxy radical, a halogen atom, or a carboxy group, X represents NH or S, $R^2$ and $R^3$ are the same or different and are selected from the group consisting of hydrogen, a $C_{1-22}$ alkyl radical, a $C_{1-22}$ alkoxy radical, a carboxy group, a halogen atom and a nitro group, or $R^2$ and $R^3$ are members of a 5- to 7-membered ring, Y is CH or N, $R^4$ is hydrogen, a $C_{1-22}$ alkyl radical or a $C_{6-14}$ aryl radical, $R^5$ is a $C_{1-22}$ alkylene radical or a chemical bond and $Z^1$ and $Z^2$ are hydrogen, a carboxy group, an ester group, an amino group or a $C_{1-22}$ alkyl or $C_{1-6}$ dialkylamino group and, optionally, C) 0 to 400 parts by weight, based on 100 parts by weight of the mixture of A) and B), of at least one of fillers and reinforcing materials, in a melt for 10 to 120 seconds at temperatures of from 280° to 360° C., wherein said mixing is performed in extruders or kneaders.

2. A process as claimed in claim 1, wherein said mixing consists of mixing components A) and B) in an initial melt for 10 to 120 seconds at temperatures of from 280° to 360° C., and adding component C) in a separate melting step.

3. A process for the production of polyarylene sulfides, wherein said process consists of mixing A) 99.8 to 93% by weight polyphenylene sulfides having a melt viscosity of 15 to 500 Pas (310° C., 1000 1/s), B) 0.2 to 7% by weight disulfides corresponding to formulae (I), (II) and/or (III)

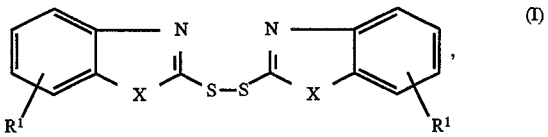

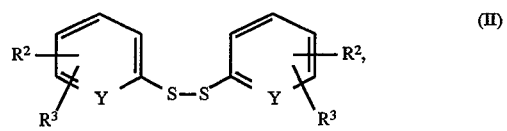

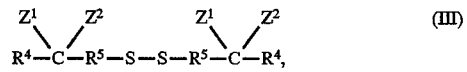

in which $R^1$ is hydrogen, a $C_{1-22}$ alkyl radical, a $C_{1-22}$ alkoxy radical, a halogen atom, or a carboxy group, X represents NH or S, $R^2$ and $R^3$ are the same or different and are selected from the group consisting of hydrogen, a $C_{1-22}$ alkyl radical, a $C_{1-22}$ alkoxy radical, a carboxy group, a halogen atom and a nitro group, or $R^2$ and $R^3$ are members of a 5- to 7-membered ring, Y is CH or N, $R^4$ is hydrogen, a $C_{1-22}$ alkyl radical or a $C_{6-14}$ aryl radical, $R^5$ is a $C_{1-22}$ alkylene radical or a chemical bond and $Z^1$ and $Z^2$ are hydrogen, a carboxy group, an ester group, an amino group or a $C_{1-22}$ alkyl or $C_{1-6}$ dialkylamino group and C) 0 to 400 parts by weight, based on 100 parts by weight of the mixture of A) and B), of at least one of fillers and reinforcing materials, by first mixing A) and C) in a melt to form a first mixture and then mixing said first mixture with B) in a melt for 10 to 120 seconds at temperatures of from 280° to 360° C., wherein said mixing is performed in extruders or kneaders.

4. A process for the production of polyarylene sulfides as claimed in claim 1, wherein $R^2$ and $R^3$ are members of a benzene ring.

5. A process as claimed in claim 1, wherein

Y is N and $R^2$ and $R^3$ are the same or different and are selected from the group consisting of hydrogen, a $C_{1-22}$ alkyl radical, a $C_{1-22}$ alkoxy radical and a nitro group.

6. Polyarylene sulfides produced by the process of claim 1.

7. Polyarylene sulfides produced by the process of claim 3.

8. A process as claimed in claim 1, wherein $Z^1$ and $Z^2$ are hydrogen, a carboxy group a $C_{1-6}$ ester group, an amino group, or a $C_{1-6}$ alkyl or $C_{1-6}$ dialkylamino group.

9. A process as claimed in claim 3, wherein $Z^1$ and $Z^2$ are hydrogen, a carboxy group a $C_{1-6}$ ester group, an amino group, or a $C_{1-6}$ alkyl or $C_{1-6}$ dialkylamino group.

* * * * *

UNITED STATES PATENT AND TRADEMARK OFFICE
CERTIFICATE OF CORRECTION

PATENT NO. : 5,654,383
DATED : August 5, 1997
INVENTOR(S) : Kohler et al.

It is certified that error appears in the above-identified patent and that said Letters Patent is hereby corrected as shown below:

In Column 3, line 37 (Claim 1) and in Column 4, line 21 (Claim 3), "represents" should be --is--.

Signed and Sealed this

Twentieth Day of January, 1998

Attest:

BRUCE LEHMAN

*Attesting Officer*　　　　*Commissioner of Patents and Trademarks*